(12) United States Patent
Strengert et al.

(10) Patent No.: US 8,548,708 B2
(45) Date of Patent: Oct. 1, 2013

(54) BRAKE SYSTEM FOR A VEHICLE AND METHOD FOR OPERATING A BRAKE SYSTEM FOR A VEHICLE

(75) Inventors: Stefan Strengert, Stuttgart (DE); Werner Harter, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 547 days.

(21) Appl. No.: 12/452,783

(22) PCT Filed: Jun. 30, 2008

(86) PCT No.: PCT/EP2008/058366
§ 371 (c)(1),
(2), (4) Date: Mar. 31, 2010

(87) PCT Pub. No.: WO2009/015962
PCT Pub. Date: Feb. 5, 2009

(65) Prior Publication Data
US 2010/0204894 A1    Aug. 12, 2010

(30) Foreign Application Priority Data
Aug. 2, 2007 (DE) .................. 10 2007 036 261

(51) Int. Cl.
*G06G 7/76* (2006.01)

(52) U.S. Cl.
USPC .............. 701/70; 701/48; 700/79; 303/11; 303/113.2; 303/122.04; 303/122.08; 303/122.09; 188/162; 180/65.1; 73/126; 29/428

(58) Field of Classification Search
USPC ............ 701/48, 70; 700/79; 303/11, 113.2, 303/122.04, 122.08, 122.09; 188/162; 180/65.1; 73/126; 29/428
See application file for complete search history.

(56) References Cited

U.S. PATENT DOCUMENTS

| | | | |
|---|---|---|---|
| 3,899,215 A * | 8/1975 | Sutton | 303/122.08 |
| 3,899,916 A * | 8/1975 | Cline | 73/126 |
| 4,389,076 A * | 6/1983 | Ostwald | 303/122.09 |
| 5,170,343 A * | 12/1992 | Matsuda | 700/79 |
| 5,255,962 A | 10/1993 | Neuhaus et al. | |
| 8,185,288 B2 * | 5/2012 | Strengert et al. | 701/70 |
| 2003/0037427 A1 * | 2/2003 | Chernoff et al. | 29/428 |
| 2004/0069545 A1 * | 4/2004 | Chernoff et al. | 180/65.1 |
| 2006/0015231 A1 * | 1/2006 | Yoshimura et al. | 701/48 |
| 2007/0188014 A1 * | 8/2007 | Sato et al. | 303/11 |
| 2007/0188017 A1 * | 8/2007 | Niino et al. | 303/113.2 |
| 2007/0188019 A1 * | 8/2007 | Maki et al. | 303/122.04 |
| 2008/0021623 A1 | 1/2008 | Frey et al. | |
| 2009/0200124 A1 * | 8/2009 | Heise | 188/162 |

FOREIGN PATENT DOCUMENTS

| | | |
|---|---|---|
| DE | 196 34 567 | 3/1998 |
| DE | 198 26 131 | 12/1999 |
| DE | 103 57 373 | 7/2005 |
| DE | 10 2004 009 469 | 9/2005 |
| EP | 0 467 112 | 1/1992 |
| EP | 0 754 611 | 1/1997 |
| EP | 1 053 153 | 3/2003 |
| JP | 61-181761 | 8/1986 |
| JP | 2000-25591 | 1/2000 |
| JP | 2002-502755 | 1/2002 |
| WO | WO 95 13 946 | 5/1995 |

* cited by examiner

*Primary Examiner* — James Trammell
*Assistant Examiner* — Sanjeev Malhotra
(74) *Attorney, Agent, or Firm* — Kenyon & Kenyon LLP (57) ABSTRACT

A brake system for a vehicle has a first and a second brake control device, four wheel actuator devices, and a first and a second signal line, the first signal line connecting the first brake control device to two of the four wheel actuator devices and the second signal line connecting the second brake control device to the two other wheel actuator devices, each of the four wheel actuator devices in the active state being additionally designed to detect whether a specified number of brake control devices and/or wheel actuator devices are in the inactive state, in which case a specified braking torque is exerted on the wheel of the vehicle associated with the brake control device.

11 Claims, 5 Drawing Sheets

BRAKE SYSTEM FOR A VEHICLE AND METHOD FOR OPERATING A BRAKE SYSTEM FOR A VEHICLE

BACKGROUND OF THE INVENTION

1. Field of the Invention

The present invention relates to a brake system for a vehicle, and to a method for operating a brake system for a vehicle.

2. Description of Related Art

Published international patent document WO 95 13 946 describes an electrical brake system having a central module for controlling various brake circuits. The central module is connected to the brake circuits via a communication system.

Published German patent document DE 196 34 567 A1 describes a decentralized electromechanical brake system. It includes a pedal unit, a processing unit and wheel pair units for regulating the wheel brakes. The brake system is powered with the aid of at least two vehicle electrical systems.

Furthermore, published German patent document DE 103 57 373 B4 describes an electronic brake system, which has a brake pedal having two braking request means. One of the two braking request means is connected to a central control unit having an integrated brake circuit control system. The other braking request means is coupled to an autonomous brake circuit control system. In the event of a failure of the central control unit or the autonomous brake circuit control system, the remaining brake circuit control system is to control at least one brake circuit using its associated braking request means.

Conventional brake systems, however, are only insufficiently protected against functional failures of several of their components. If several components of a brake system fail successively while driving, this may result in a safety-relevant loss of braking efficacy.

It is therefore desirable to have a brake system, which—even in the event of malfunctions in several components of the brake system—still ensures a safe braking action of the vehicle having the affected brake system.

BRIEF SUMMARY OF THE INVENTION

The present invention is based on the realization that at least one wheel actuator device of a brake system for exerting a braking torque on an associated wheel may be developed in such a way that it detects when an operability of other components of the brake system no longer exists and, if indicated, automatically exerts a specified braking torque on the associated wheel. Such a wheel actuator device is always able to initiate an automatic braking operation of the vehicle in situations in which a braking operation of the vehicle controlled by the driver is no longer possible due to a failure of several components of the brake system. The brake system according to the present invention and the corresponding method thus ensure a safe reduction of the speed of the vehicle for avoiding accidents in the event of the occurrence of severe malfunctions in several components of brake system.

According to the present invention, the wheel actuator devices initiate an automatic braking operation in situations in which dangerous consequences of failures in control units occur, which in a conventional two-circuit brake system having two central brake control devices would result in a complete loss of the braking action. For this purpose, failures of central brake control devices or wheel actuator devices, which occur at a time interval of few computing cycles, may be detected as separate failures. With reference to today's usual computing cycles of 5 ms to 10 ms, the minimum interval for distinguishable errors succeeding each other in time is approximately 20 ms to 40 ms. The probability that two brake control devices and/or wheel actuator devices fail within this brief time interval is very low.

With the aid of the present invention it is also possible to brake a diagonal of brake-ready wheels when at least two components of a brake system fail. Likewise, in a corresponding situation, three wheel actuator devices are also able to bring their respectively associated brake-ready wheels to a standstill. This automatic braking operation may be configured in various ways. For example, in an automatic braking operation, half of the maximum braking torque may be applied to the brake-ready wheels until the vehicle is at a standstill. Subsequently, the parking brake may be activated. As an alternative, it is also possible to exert the braking torque only until the speed of the vehicle has been reduced to a desired maximum speed, for example in the range of walking speed.

The brake system according to the present invention has a simple system architecture having two brake circuits. The present invention is additionally based on the realization that in conventional brake systems having only one brake control device, the brake control device represents a bottleneck for the availability and safety of the power-operated brake system (brake-by-wire system).

The present invention is not limited to a vehicle having four wheels. The brake system according to the present invention may also have six or eight wheel actuator devices. In this case, each of the two brake circuits has for example three or four of the wheel actuator devices assigned to it, which are designed automatically to brake the associated wheel when a functional failure of several components of the brake system is detected. The brake system according to the present invention may also have more than two brake circuits.

In an example embodiment of the brake system, each of the two brake control devices is designed to check its operability itself and to switch itself to the inactive state when an impairment of its operability is detected and/or to output a warning signal to the other brake control device and/or at least one of the wheel actuator devices. Likewise, each of the four wheel actuator devices may be designed accordingly. The brake control devices and/or the wheel actuator devices are designed to be fail-silent. They check their current operability and in response to detecting an impairment of their operability transition into a state in which they no longer influence the other components of the brake system. This improves the safety of such a brake system.

In one example embodiment of the present invention, each of the four wheel actuator devices is designed to detect on the basis of the received warning signal that at least one of the brake control devices and/or wheel actuator devices is in the inactive state. Alternatively or additionally, each of the four wheel actuator devices may also be designed to detect whether a signal is received from one of the brake control devices and/or wheel actuator devices within a specified time period, and, if this is not the case, to detect that the respective brake control device and/or wheel actuator device is in the inactive state. Using these techniques, a wheel actuator device is able to detect reliably which components of the brake system are still operable.

For example, each of the wheel actuator devices connected to the first signal line is designed automatically to exert the specified braking torque on the associated wheel of the vehicle when it detects that first the second brake control device and then the second brake control device is in the inactive state. In a conventional two-channel brake system having two brake control devices, there is no more braking action after a failure of the two brake control devices. The vehicle equipped with the conventional brake system therefore cannot be braked safely in such a situation. By contrast, a vehicle having a brake system according to the present invention is still able to perform a safe braking operation following a failure of the two brake control devices.

Furthermore, each of the wheel actuator devices connected to the first signal line may be designed automatically to exert the specified braking torque on the associated wheel of the vehicle when it detects that the wheel actuator devices connected to the second signal line and the first brake control device are in the inactive state. This also represents an improvement over a conventional brake system.

In an example embodiment of the brake system, the first and the second brake control devices are connected to each other via a third signal line. The two brake control devices are thus able to exchange date with each other. Likewise, via the third signal line, each brake control device is able to output information regarding the state of the wheel actuator devices of its own brake circuit to the other brake control device.

In a further development, the first and the second brake control devices are connected via the third signal line to an in-vehicle display device. The brake control devices are then preferably developed to signal to the display device their own states and the states of the wheel actuator devices of their brake circuits. The display device thus detects for example that both brake control devices failed sequentially and relays this information to the driver via an image display or an announcement. When his vehicle is suddenly braking, the driver learns about the cause of the braking action and is able to behave accordingly. The brake control devices are also able to signal the state of the brake system to an external control unit. In this manner, the external control unit gains a clear view of the state of the brake system in the event of a failure of several components of the brake system. Following the occurrence of errors in the brake system, the external control unit is then able to adapt its reaction to the available safety reserves as a function of the errors that have occurred.

In an example implementation of the method of the present invention, a message corresponding to the ascertained state is output to an external display device, to an external sound output device and/or to an external control unit. In this manner, the driver may be informed via the display device and/or the sound output device about the state of the brake system of his vehicle. Likewise, by an intervention, the external control unit is able to compensate for the functional impairment of the brake system after a functional failure in the brake system has been detected.

DETAILED DESCRIPTION OF THE INVENTION

Figure 1:
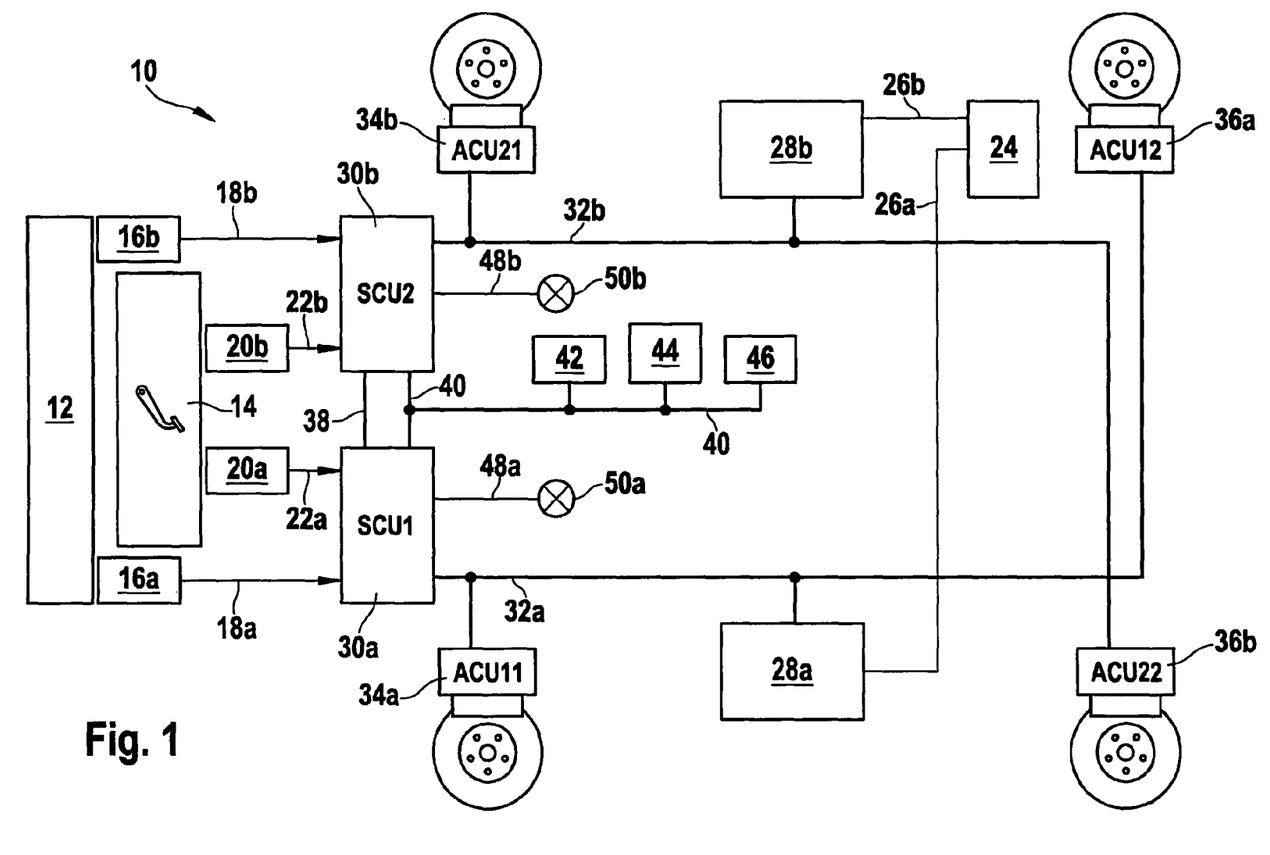
FIG. 1 shows an example embodiment of the brake system according to the present invention.

FIG. 1 shows an example embodiment of the brake system according to the present invention. The represented brake system 10 is developed electromechanically having two separate brake circuits, which are used to brake the four wheels of a vehicle. As will be explained in more detail below, brake system 10 has a diagonal brake circuit distribution.

Brake system 10 is controllable by operating a parking brake activation device 12 or a brake pedal 14. For this purpose, two parking brake switches 16a and 16b are attached to parking brake activation device 12, which through their signals 18a and 18b respectively control one of the brake circuits of brake system 10. Analogously, an operation of brake pedal 14 is detected by two brake pedal switches 20a and 20b, which are designed to output signals 22a and 22b in accordance with the operation.

A base vehicle electrical system 24 supplies power to brake system 10. Via two power supply lines 26a and 26b, base vehicle electrical system 24 is connected respectively to a first vehicle electrical system 28a and a second vehicle electrical system 28b.

Brake system 10 is equipped with two brake control devices 30a and 30b. Both brake control devices 30a and 30b are a SCU (system control unit) for example. First brake control device 30a is associated with a first brake circuit. Via a data bus 32a, first brake control device 30a is connected to wheel actuator devices 34a and 36a, which are respectively associated with one wheel of the vehicle. The wheels of wheel actuator devices 34a and 36a are situated diagonally on the vehicle. Wheel actuator device 34a controls the brake disk of the left front wheel and wheel actuator device 36a controls the brake disk of the right rear wheel. Both wheel actuator devices 34a and 36a include all the electronics required for safe operation. A wheel actuator device 34a, 34b, 36a or 36b is preferably an ACU (actor control unit).

Components 30a, 34a and 36a of the first brake circuit are connected to first vehicle electrical system 28a via data bus 32a. Brake control device 30a exchanges data with wheel actuator devices 34a and 36a and with first vehicle electrical system 28a via data bus 32a. At the same time, brake control device 30a and wheel actuator devices 34a and 36a of the first brake circuit are supplied with power by first vehicle electrical system 28a via data bus 32a.

Brake control device 30a is coupled to parking brake switch 16a and brake pedal switch 20a and thus receives signals 18a and 22a. In accordance with received signals 18a and 22a, brake control device 30a outputs control signals to wheel actuator devices 34a and 36a for braking the associated wheels.

Analogously, second brake control device 30b receives signals 18b and 22b of switches 16b and 20b. Second brake control device 30b is connected to two further wheel actuator devices 34b and 36b and second vehicle electrical system 28b via a data bus 32b. Wheel actuator device 34b is designed to brake the right front wheel. Wheel actuator device 36b operates the brake disk of the left rear wheel of the vehicle.

The two brake control devices 30a and 30b are connected to each other via two data buses 38 and 40. Data bus 38 is used only for internal communication between the two brake control devices 30a and 30b. Via data bus 40, the two brake control devices 30a and 30b are also connected to a cockpit display device 42, to an ESP system 44 (electronic stability program) and to an engine control unit 46. With the aid of data bus 40, the two brake control devices 30a and 30b are able to exchange data with external vehicle components 42, 44 and 46. Furthermore, via data bus 40, brake control devices 30a and 30b may also be connected to a vehicle CAN and/or a workshop diagnostic system.

Data between the first brake circuit and the second brake circuit are also exchanged via the bidirectional data buses 38 and 40. These data are for example signals 18a, 18b, 22a and 22b of switches 16a, 16b, 20a and 20b or states of brake control devices 30a and 30b and wheel actuator devices 34a, 34b, 36a and 36b. In addition, external brake torque requests for the two brake circuits are transmitted via data bus 40. The two brake control devices 30a and 30b for their part transmit the actual values of the wheel brake torques to the external vehicle components 42 through 46. In the event of an error within brake system 10, brake control devices 30a and 30b transmit requests to external vehicle components 42 through 46 for limiting the drive torque.

First brake control device 30a is additionally coupled to a warning lamp 50a of the first brake circuit in the cockpit via a line 48a. Likewise, second brake control device 30b controls a warning lamp 50b of the second brake circuit in the cockpit via a line 48b.

Figure 2:
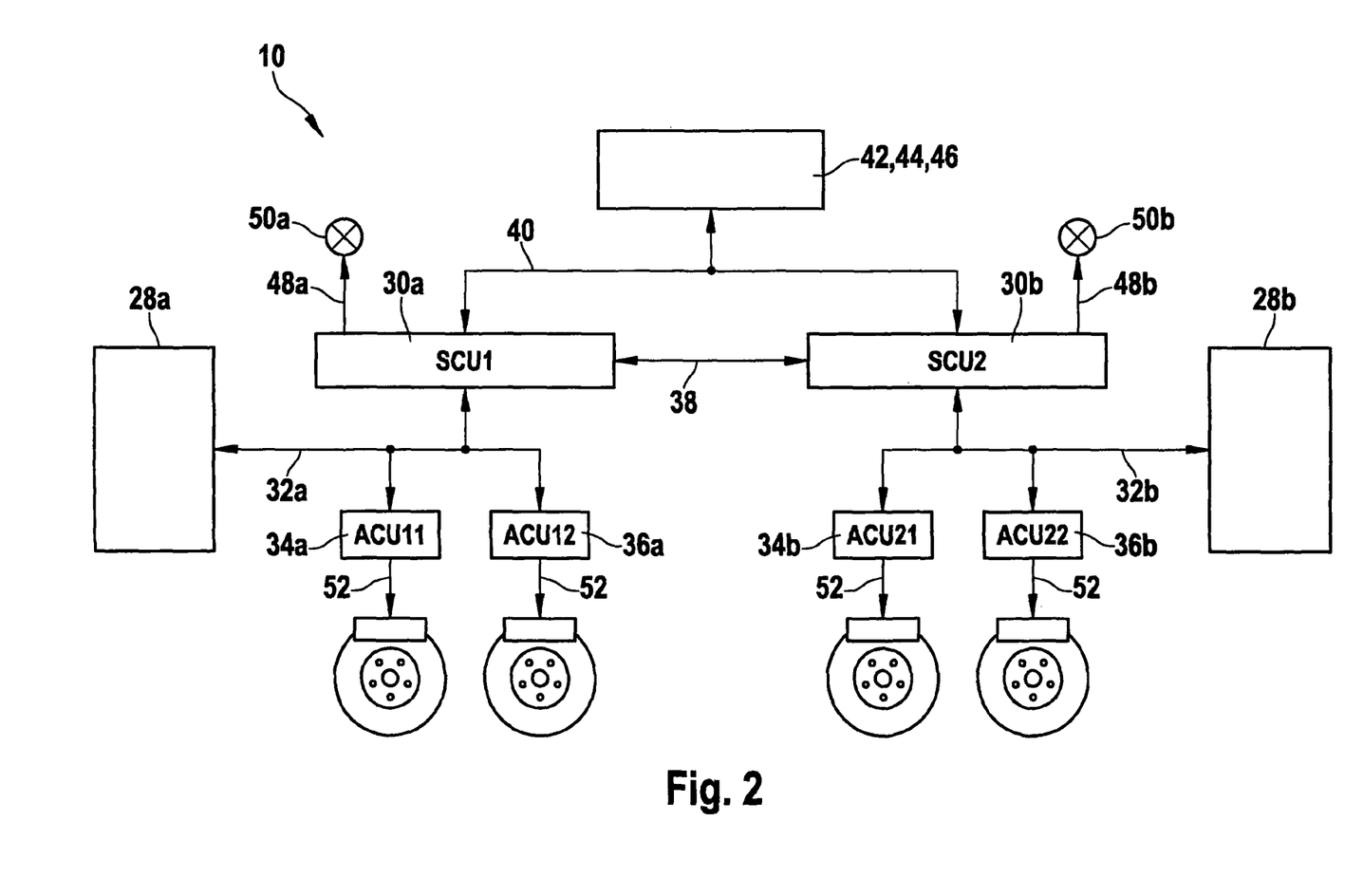
FIG. 2 shows a hierarchy of the components of the brake system from FIG. 1 when all components are fully operable.

FIG. 2 shows a hierarchy of the components of brake system 10 from FIG. 1 when all components are fully operable.

If all of the components of brake system 10 are fully operable, then the two brake control devices 30a and 30b exchange commands and data with external system (ESY, external system) 42 through 46. External system 42 through 46 includes cockpit display device 42, ESP system 44 and engine control unit 46. Additionally, the two brake control devices 30a and 30b are designed to detect an operation of the brake pedal or a parking brake operation (not sketched). Brake control devices 30a and 30b then control warning lamps 50a and 50b and wheel actuator devices 34a, 34b, 36a and 36b accordingly.

The two brake control devices 30a and 30b are also able to exchange data between each other via data buses 38 and 40. Furthermore, brake control device 30a of the first brake circuit is able to exchange data with the associated first vehicle electrical system 28a and wheel actuator devices 34a and 36a. In particular, brake control device 30a outputs braking commands to wheel actuator devices 34a and 36a via data bus 32a. Likewise, via data bus 32b, brake control device 30b of the second brake circuit is able to perform a data transmission with wheel actuator devices 34b and 36b and output braking commands to the latter. Brake control device 30b is also able to exchange information with second vehicle electrical system 28b.

Each of the four wheel actuator devices 34a, 34b, 36a and 36b is designed to exert a braking torque 52 on its associated wheel after receiving an appropriate control signal. In this manner, when the components of brake system 10 are fully operable, an operation of the brake pedal or of the parking brake switch is convertible into a braking operation on the wheels of the vehicle.

The hierarchy of the individual components of brake system 10 shown in FIG. 2 is suspended as soon as one of the components detects that its operability is impaired.

Brake control devices 30a and 30b are designed to be fail-silent, i.e. they check their own operability and, when detecting a deficient operability, they switch to an inactive state, in which they do not send any further braking commands to the wheel actuator devices 34a and 36a or 34b and 36b of their brake circuits. Likewise, wheel actuator devices 34a, 34b, 36a and 36b are designed to check themselves and to switch to an inactive state under specific conditions. Following an automatic switch to an inactive state, wheel actuator devices 34a, 36a and 36b output no further control commands to the respective wheel actuator of the associated wheel. The wheel brake is then opened such that the wheel is free and non-braked. Shortly before or after a switch to an inactive state, a brake control device 30a or 30b or a wheel actuator device 34a, 34b, 36a or 36b is still capable of outputting a respective error message to the other components of brake system 10.

Furthermore, wheel actuator devices 34a, 34b, 36a and 36b are designed to detect a sequential occurrence of malfunctions in the other wheel actuator devices 34a, 34b, 36a or 36b and/or in brake control devices 30a and 30b. Wheel actuator devices 34a, 34b, 36a and 36b also detect situations in which several wheel actuator devices 34b, 36a or 36b and/or brake control devices 30a or 30b are inactivated. For this purpose, wheel actuator devices 34a, 34b, 36a and 36b evaluate a received error message for example. As an alternative or in addition, wheel actuator devices 34a, 34b, 36a and 36b of brake system 10 may also be designed to check whether they receive within a specified time period a feedback signal or a signal from a brake control device 30a or 30b or another wheel actuator device 34a, 34b, 36a or 36b.

Brake strategies are stored in wheel actuator devices 34a, 34b, 36a, and 36b, which are executed after a situation has been detected in which a driver-controlled reaction of brake system 10 is no longer possible. On the assumption that the failures of the components of brake system 10 occur sequentially, there still remain one to two wheels of the vehicle, which are capable of being braked, even after a failure of several components of brake system 10. Such a situation exists, for example, if several other components 30a, 30b, 34a, 34b, 36a or 36b of brake system 10 are switched to an inactive state. Following a sequential occurrence of malfunctions in other wheel actuator devices 34a, 34b, 36a or 36b and/or in the two brake control devices 30a or 30b, wheel actuator devices 34a, 34b, 36a and 36b are thus capable of executing a specified braking strategy that is adapted to the occurring situation. The specified braking strategies include an automatic braking operation of wheel actuator devices 34a, 34b, 36a and/or 36b if they detect that either both brake control devices 30a and 30b have failed or that two other wheel actuator devices 34a, 34b, 36a or 36b and the associated brake control device 30a or 30b have failed. The braking strategies of the individual wheel actuator devices 34a, 34b, 36a and 36b are coordinated with one another. In particular, the commands stored in wheel actuator devices 34a, 34b, 36a and 36b match one another.

Braking strategies for various situations are described in the following. In this context, a failure is understood so as also to include the case in which a brake control device 30a and 30b or a wheel actuator device 34a, 34b, 36a and 36b switches autonomously to an inactive state.

For example, while a vehicle having brake system 10 is driving, a situation may occur where both brake control devices 30a and 30b of brake system 10 fail in quick succession. Wheel actuator devices 34a, 34b, 36a and 36b of brake system 10 are therefore designed to effect a reduction of the speed of the vehicle after this situation has been detected. For this purpose, the two wheel actuator devices 34a and 36a or 34b and 36b, whose associated brake control device 30a or 30b failed most recently, initiate an automatic braking of their associated wheels. If initially first brake control device 30a fails and subsequently second brake control device 30b fails, the two wheel actuator devices 34b and 36b of the second brake circuit exert a braking torque 52 on their wheels, which causes the vehicle to come to a standstill within a specified time period or to reduce its speed to a specified maximum speed.

In addition, wheel actuator devices 34a and 36a of the first brake circuit and wheel actuator devices 34b and 36b of the second brake circuit are also able to detect a failure of the two wheel actuator devices 34a and 36a or 34b and 36b of the other brake circuit. The still active wheel actuator devices 34a and 36a or 34b and 36b are then able to activate immediately a braking torque 52 on their wheels. It is likewise possible that the still operable wheel actuator devices 34a and 36a or 34b and 36b initiate an automatic braking operation in this situation only if they detect that brake control device 30a or 30b of their own brake circuit is also no longer active. Such a situation exists for example if wheel actuator devices 34a and 36a of the first brake circuit and second brake control device 30b fail in succession. After detecting such a situation, the two wheel actuator devices 34b and 36b of the second brake circuit immediately begin to brake their associated wheels automatically.

A sequential failure of several components of the brake control system also exists if first one of wheel actuator devices 34a, 34b, 36a or 36b and subsequently the two brake control devices 30a and 30b fail. Preferably, wheel actuator devices 34a and 36a or 34b and 36b, in whose brake circuit no wheel actuator device 34a, 34b, 36a or 36b was switched to an inactive state, then initiate a braking maneuver. If brake control devices 30a and 30b and wheel actuator device 34a fail for example, then wheel actuator devices 34b and 36b immediately begin to brake the vehicle. As an alternative, the still active wheel actuator device 36a may also exert an amplified braking action on its associated wheel.

Even after a sequential occurrence of malfunctions in several of its components while driving, brake system 10 is thus still able to reduce the speed of the vehicle having brake system 10. The speed may be reduced automatically until the vehicle has been brought to a standstill. In such a sequential failure of several components of brake system 10, this contributes to the avoidability of an accident, or at least to the ability of minimizing the consequences of such an accident by drastically reducing the speed of the vehicle having brake system 10. This increases the safety for the occupants of the vehicle having brake system 10.

During the automatic braking process, the state of brake system 10 may be signaled to external components 42 through 46 via data bus 40. For example, a state information is transmitted to cockpit display device 42. Cockpit display device 42 then activates a corresponding image display or a sound output. In this manner, the driver of the vehicle having brake system 10 learns why his vehicle while driving suddenly reduces its speed automatically.

In addition, external systems may compensate for or alleviate the functional impairment of brake system 10 on the basis of the information transmitted on data bus 40. For example, a driving dynamics control system may maintain the stability of the vehicle by appropriate interventions, an engine control system may reduce the drive torque or the vehicle speed, and in a vehicle having a hybrid drive, the brake system's braking action, reduced by malfunctions, may be compensated by regenerative braking using the built-in electrical generator.

Furthermore, the state information about sequentially occurring failures of components of brake system 10 output by brake system 10 are stored externally. This simplifies the error diagnosis when performing repairs later in a workshop. For the purpose of the error diagnosis, data about the functional sequence of the individual components of brake system 10 may also be stored in brake control devices 30a and 30b and in wheel actuator devices 34a, 34b, 36a and 36b.

Figure 3:
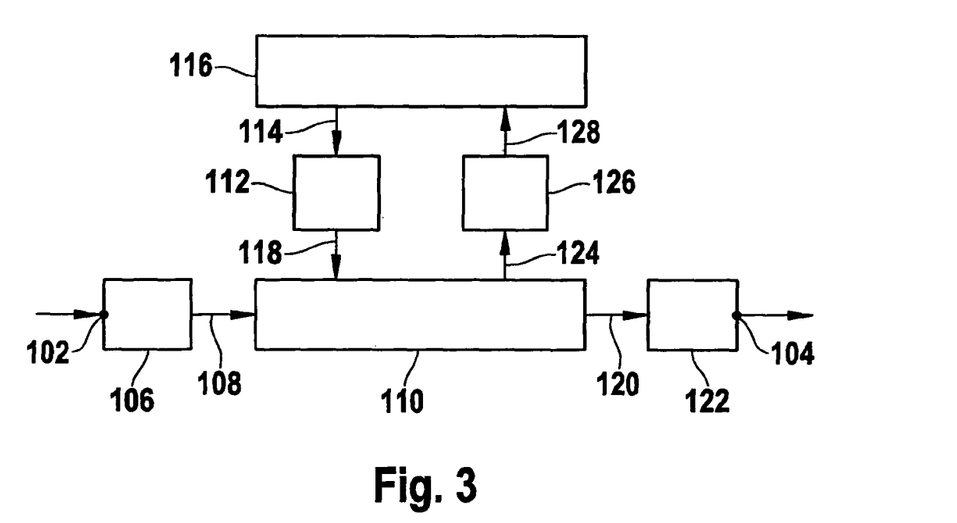
FIG. 3 shows a structure of a first example embodiment of a wheel actuator device.

FIG. 3 shows a structure of a first example embodiment of a wheel actuator device. The wheel actuator device has an input 102 and an output 104 for receiving and transmitting data. An input circuit 106 associated with input 102 is designed to detect a failure of a component of the associated brake system on the basis of the data received. If input circuit 106 detects such an event, then it outputs a corresponding notification signal 108 to an evaluation unit 110.

The wheel actuator device also includes an error detection unit 112, which checks the operability of the wheel actuator device. Additionally, error detection unit 112 checks the received signals 114 of a wheel brake 116 associated with the wheel actuator device. If error detection unit 112 ascertains significant errors, then error detection unit 112 provides a corresponding error signal 118 to evaluation unit 110.

In this instance, error detection unit 112 receives for example a faulty signal 114 from wheel brake 116. Following a reception of faulty signal 114 or following a detection of malfunctions in its own wheel actuator device, error detection unit 112 outputs a corresponding error signal 118 to evaluation unit 110.

With the aid of received signals 108 and 118, evaluation unit 110 detects the state of its own wheel actuator device and the other components of the brake system. If evaluation unit 110 ascertains a functional impairment of its own wheel actuator device, then evaluation unit 110 initiates switching off the wheel actuator device. Beforehand, evaluation unit 110 outputs an information signal 120 to an output circuit 122. Following the reception of information signal 120, output circuit 122 associated with output 104 transmits corresponding information about the imminent inactivation of the wheel actuator device to the other components of the brake system. It is also possible to activate a warning lamp with the aid of output circuit 122.

On the basis of notification signal 108, evaluation unit 110 furthermore ascertains the state of the other components of the brake system and provides a corresponding state signal 124 to a decoder 126. From state signal 124, decoder 126 derives the activities of the wheel actuator device required with regard to the current state of the brake system. If several components of the brake system are in an inactive state for example, then decoder 126 ascertains whether in such a system state there is a provision automatically to brake the wheel controlled by the wheel actuator device. If the prevailing situation requires braking the wheel associated with the wheel actuator device, then decoder 126 outputs a corresponding command 128 to wheel brake 116.

Figure 4:
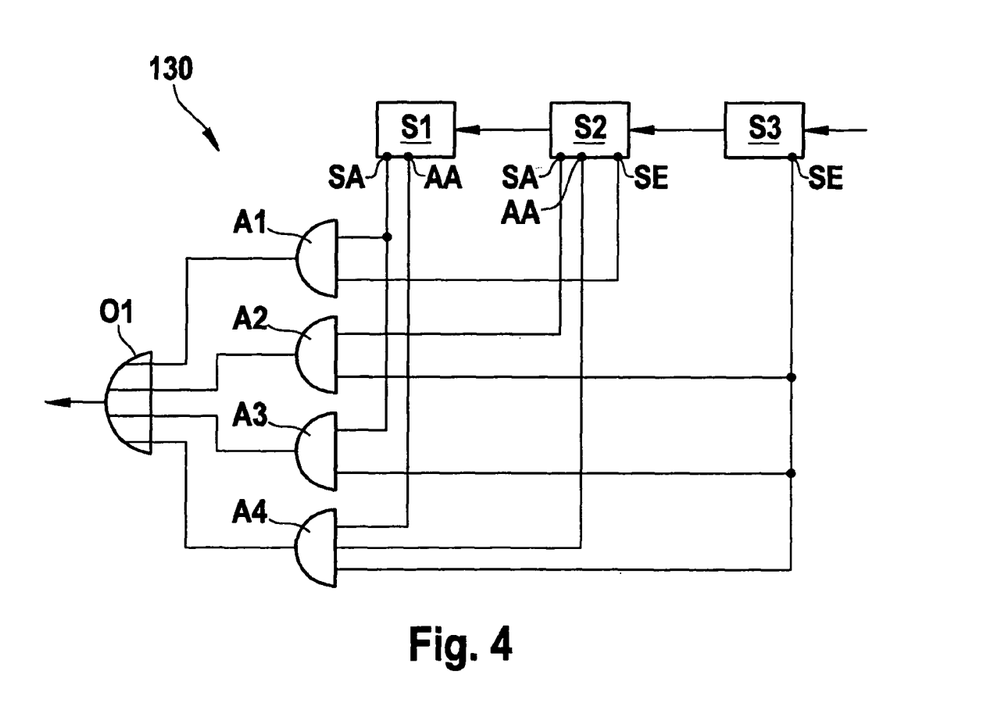
FIG. 4 shows a logic circuit of a second example embodiment of a wheel actuator device.

FIG. 4 shows a logic circuit of a second example embodiment of a wheel actuator device. Logic circuit 130 includes three buffers S1, S2 and S3 for reading in reported failures of components of the brake system. Following each additional reported failure of a component of the brake system, the content of buffers S1 through S3 is shifted to the left by a shift register (not shown). If all three buffers S1 through S3 are occupied, then buffer S1 contains the first reported event. The most recently reported failure of a component is stored as an event in buffer S3.

Events SE, SA and AA are encoded in buffers S1 through S3 using two bits. Event SE describes the failure of the brake control device of the respective brake circuit, to which the wheel actuator device is directly connected. Event SA stands for the failure of the brake control device of the other brake circuit. An event AA occurs if a wheel actuator device of the other brake circuit was inactivated following an occurrence of malfunctions.

As an alternative to the development of buffers S1 through S3 having two bits it is also possible to provide each buffer S1 through S3 with three bits in order to encode all six different control units of the brake system.

Each event SE, SA and AA has assigned to it an output on at least one of buffers S1, S2 or S3. Buffers S1 through S3 are thus designed to indicate their content directly or through an appropriate decoding process.

The AND gates A1 through A4 and the OR gate O1 are used to decode the received error messages. For this purpose, AND gate A1 is coupled to output SA of buffer S1 and to output SE of buffer S2. Accordingly, AND gate A2 is connected to output SA of buffer S2 and to output SE of buffer S3. Similarly, AND gate A3 is connected to output SA of buffer S1 and to output SE of buffer S3. Thus a high signal will always be present at one of the outputs of an AND gate A1, A2 or A3 if first the brake control device of the other brake circuit and then the brake control device of its own brake circuit fail.

Together with output SE of buffer S3, outputs AA of buffers S1 and S2 are connected to AND gate A4. AND gate A4 thus ascertains a failure of the two wheel actuator devices of the other brake circuit and a subsequent failure of its own brake control device.

The outputs of AND gates A1, A2, A3 and A4 are connected to OR gate O1. If a high signal is applied on the output of OR gate O1, then the wheel actuator device will initiate a braking operation of its associated wheel.

Figure 5:
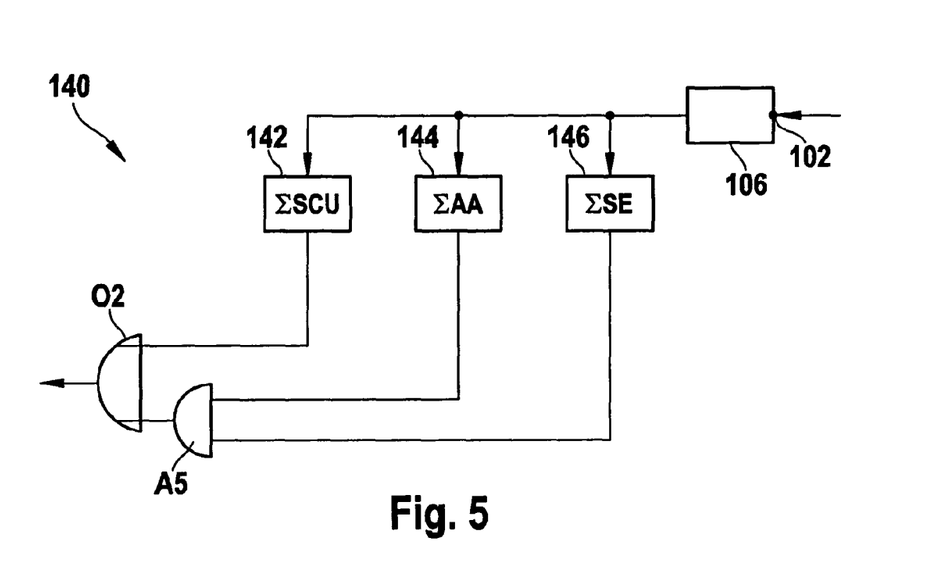
FIG. 5 shows a logic circuit of a third example embodiment of a wheel actuator device.

FIG. 5 shows a logic circuit for a third example embodiment of a wheel actuator device. Logic circuit 140 includes an input 102 having an input circuit 106 for receiving a switch-off notification from other components of the brake system. Input circuit 106 then ascertains on the basis of the received switch-off notification whether a brake control device or a wheel actuator device has failed. Likewise, input circuit 106 distinguishes between a failure of a brake control device or of a wheel actuator device of its own brake circuit and a failure of a brake control device or a wheel actuator device of the other brake circuit.

If input circuit 106 detects a failure of a brake control device, then input circuit 106 outputs a signal to a counter 142. Following the second reception of such a signal, counter 142 provides a high signal to an OR gate O2.

If input circuit 106 ascertains a failure of a wheel actuator device of the other brake circuit, then it outputs a signal to a counter 144. Counter 144 is also designed to provide a high signal in its output after receiving a second signal. The high signal of counter 144 is then transmitted to AND gate A5.

When detecting a failure of the brake control device of its own brake circuit, input circuit 106 outputs a corresponding signal to a counter 146. This signal is immediately converted by counter 146 into a high signal, which is likewise provided to AND gate A5.

Logic circuit 140 of a third example embodiment of a wheel actuator device shown in FIG. 5 is more general since it is not limited to certain sequences for the occurrence of failures in the components of the brake system. It detects the situations to be decoded even in an arbitrary number of successive failures and allows for the implementation of additional conditions such as for example a general automatic braking operation following the failure of a fourth component of the brake system. Another implementable condition is a failure of certain groups of components of the brake system such as for example a failure of the wheel actuator devices of the front axle, the rear axle, one side, one diagonal or of three wheel actuator devices.

Figure 6:
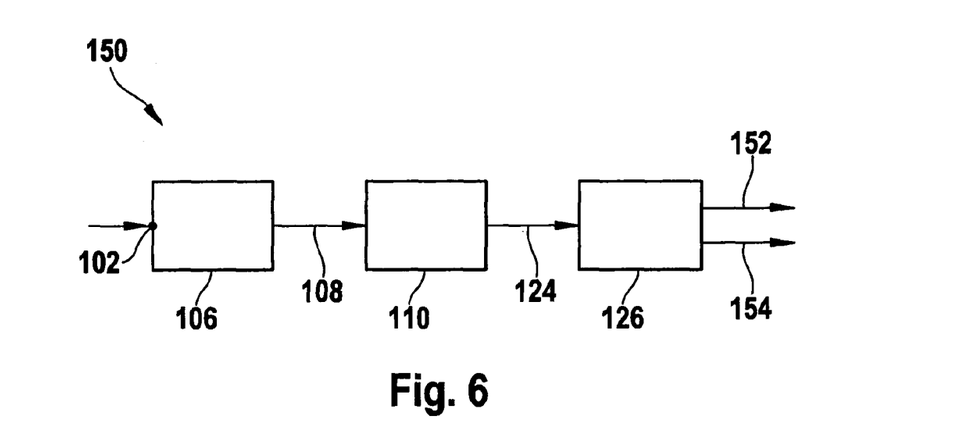
FIG. 6 shows a fourth example embodiment of a wheel actuator device.

FIG. 6 shows a fourth example embodiment of a wheel actuator device. In contrast to the wheel actuator device of FIG. 3, the wheel actuator device 150 shown here has neither an error detection unit nor an output circuit. Instead, decoder 126 is designed to output different braking torques 152 and 154 to a wheel brake (not shown).

Figure 7:
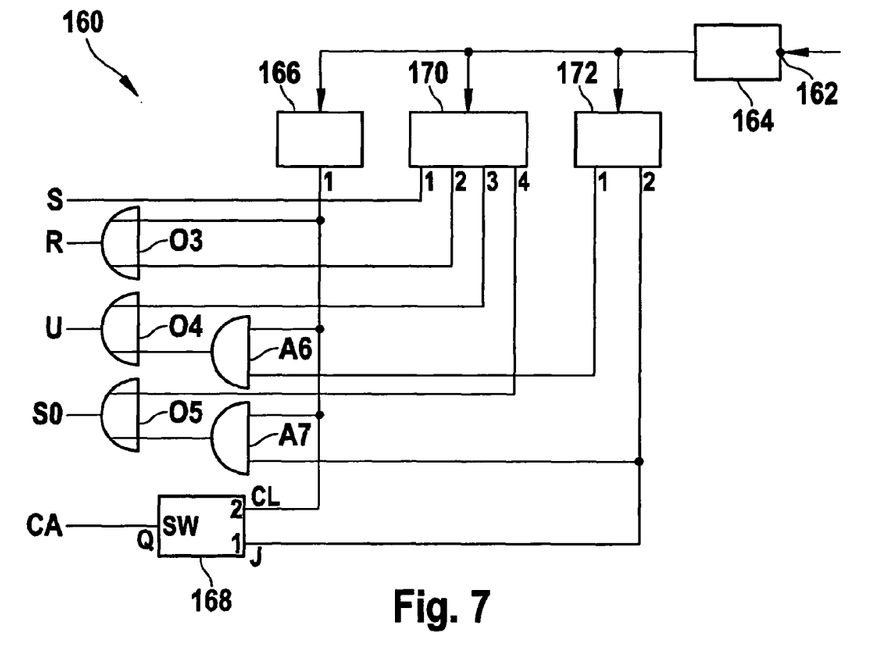
FIG. 7 shows a logic circuit of an example embodiment of a brake control device.

FIG. 7 shows a logic circuit 160 of an example embodiment of a brake control device. Logic circuit 160 has an input 162 for receiving a failure message from the other brake control device and from the wheel actuator devices of the brake system. On the basis of the received failure message, an input circuit 164 then ascertains whether the other brake control device, a wheel actuator device of its own brake circuit or a wheel actuator device of the other brake circuit has failed.

If input circuit 164 detects a failure of the other brake control device, then it outputs a signal to counter 166. Immediately upon receiving the signal, counter 166 provides a high signal in its output. This high signal is transmitted to an OR gate O3, to an AND gate A6 and to an AND gate A7. In addition, the high signal is also provided to a control unit 168.

If input circuit 164 ascertains that a wheel actuator device is switched to the inactive state, then it outputs a signal to a counter 170. Counter 170 ascertains the number of the failed wheel actuator devices. The reading of the counter maximally reaches the value of 4 if all wheel actuator devices have failed. If only one wheel actuator device has failed, then counter 170 outputs a high signal to output S. If two wheel actuator devices are switched to inactive, then a high signal is provided to OR gate O3. Following a failure of three wheel actuator devices, an OR gate O4 receives a high signal from counter 170. If all four wheel actuator devices are switched to inactive, then counter 170 outputs a high signal to an additional OR gate O5.

If input circuit 164 detects that a wheel actuator device of its own brake circuit is inactive, then a corresponding signal is output to a counter 172. Counter 172 for the number of failed wheel actuator devices in its own brake circuit reaches a maximum reading of 2. This occurs when both wheel actuator devices of its own brake circuit have failed. If only one wheel actuator device of its own brake circuit is in the inactive state, then counter 172 outputs a high signal to AND gate A6. If both wheel actuator devices of its own brake circuit are switched to inactive, however, then a high signal is output to AND gate A7 and to control unit 168.

AND gate A6 detects a situation in which the other brake control device and a wheel actuator device of its own brake circuit are inactive. AND gate A6 then outputs a high signal to OR gate O4.

AND gate A7 is used to ascertain a situation in which the other brake control device and both wheel actuator devices of its own brake circuit are inactivated. If this situation occurs, then AND gate A7 outputs a high signal to OR gate O5.

OR gate O3 provides a high signal to an output R if the other brake control device or two control devices have failed. OR gate O4 is associated with output U. A high signal is provided on output U if three wheel actuator devices are inactivated or if the other brake control device and one wheel actuator device of its own brake circuit have failed.

OR gate O5 is used to control output S0. Output S0 receives a high signal if all four wheel actuator devices are inactivated or if the other brake control device and two wheel actuator devices of its own brake system have failed.

Control unit 168 may be implemented by a JK flip-flop for example, at whose set input J the signal of counter 172 is applied and at whose clock input CL the signal of counter 166 is applied. The control unit is coupled to output CA.

Outputs S, R, U, S0 and CA correspond to messages, which are output to an external system when a high signal is applied. The S output corresponds to the message that only one wheel actuator device has failed. When there is a high signal on output R, a message is output that the other brake control device or two wheel actuator devices have failed, which does not require an automatic braking of the vehicle. If a high signal is applied on output U, then either three wheel actuator devices or the other brake control device and one wheel actuator device or the other brake control device and one wheel actuator device of its own brake circuit have failed. Such a situation does not yet require an automatic braking of the vehicle.

There is a high signal on output S0 whenever either all four wheel actuator devices or the other brake control device and two wheel actuator devices of its own brake circuit have failed. In such a situation, a corresponding error message is output.

With the aid of output CA, a corresponding message is output whenever first the two wheel actuator devices of its own brake circuit and then the other brake control device fail.

Figure 8:
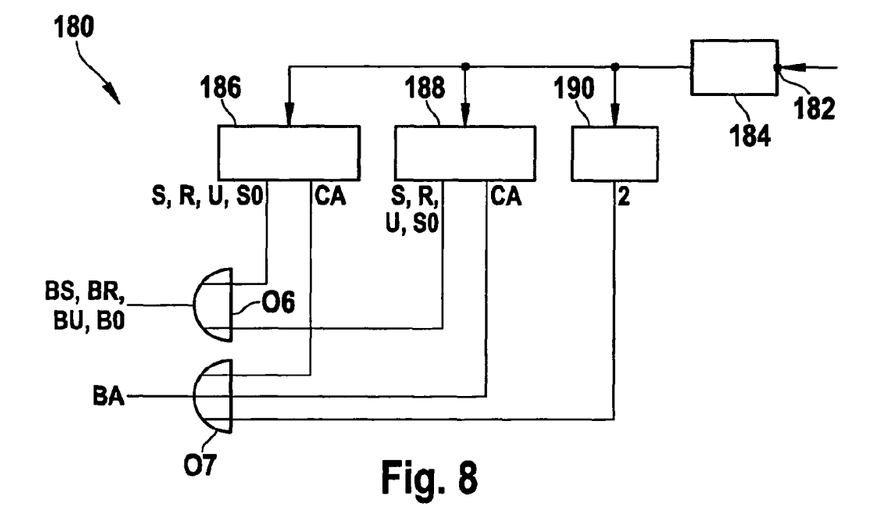
FIG. 8 shows a logic circuit for an example embodiment of an external system.

FIG. 8 shows a logic circuit 180 for an example embodiment of an external system. With the aid of logic circuit 180, the external system converts the messages S, R, U, S0 or CA received from the two brake control devices into an output message, which is displayed to the driver via an in-vehicle display device.

Logic circuit 180 has an input 182, which has an input circuit 184 assigned to it. Depending on whether the message is received from the brake control device of the first brake circuit or the brake control device of the second brake circuit, input circuit 184 transmits the message to a counter 186 or 188. In addition, input circuit 184 notifies a counter 190 after each reception of a message from a brake control device.

Each of the two counters 186 and 188 is designed to differentiate between the messages S, R, U and S0 or the message CA. If a message S, R, U or S0 is received, then each of the two counters 186 and 188 outputs a high signal to an OR gate O6, which is coupled to outputs BS, BR, BO and BU.

If one of the two counters 186 or 188 receives the message CA, then it provides a high signal to an OR gate O7. Counter 270 also outputs a high signal to OR gate O7 when its counter reading is 2. OR gate O7 is coupled to output BA.

In the event of a high signal on output BS, the suggestion is made to the driver to visit a service station for example. If the high signal is present on output BR, then he is urgently advised to do so. If a high signal is present on output BU, the driver is given an additional warning of urgency. This also happens in the event that a high signal is applied on output BO. If the high signal is applied on output BA by contrast, then the driver will be informed about the fact that now his vehicle will be braked automatically due to the state of his brake system.

What is claimed is:

1. A brake system for a vehicle, comprising:
    a first brake control device and a second brake control device, each of the first and second brake control devices being configured to (a) detect, in the active state, an input of a driver of the vehicle for reducing the current speed of the vehicle and (b) output a corresponding control signal when the input is detected;
    four wheel actuator devices respectively assigned to four different wheels of the vehicle and configured to exert, in the active state, a braking torque on the associated wheel upon receiving the corresponding control signal; and
    a first signal line and a second signal line configured to transmit the control signal, the first signal line connecting the first brake control device to two of the four wheel actuator devices, and the second signal line connecting the second brake control device to the other two wheel actuator devices;
    wherein each of the four wheel actuator devices is further configured to detect, in the active state, whether at least one of the following two conditions is satisfied: (a) a specified number of at least one of the first and second brake control devices are in the inactive state; and (b) a specified number of wheel actuator devices are in the inactive state, and if at least one of the conditions (a) and (b) is satisfied, each of the four wheel actuator devices is further configured to automatically brake the corresponding wheel of the vehicle associated with the at least one of the first and second brake control devices.

2. The brake system as recited in claim 1, wherein each of the first and second brake control devices is further configured to: (a) perform an operability check of itself; and (b) further perform at least one of the following when an impairment of operability is detected: (i) switching itself to the inactive state, (ii) outputting a warning signal to the other brake control device, and (iii) outputting a warning signal to at least one of the wheel actuator devices.

3. The brake system as recited in claim 2, wherein each of the four wheel actuator devices is further configured to: (a) detect whether a signal is received from one of the brake control devices within a specified time period, and (b) if no signal is received from one the brake control devices within the specified time, determine that the respective brake control device connected to the wheel actuator device is in the inactive state.

4. The brake system as recited in claim 2, wherein each of the wheel actuator devices connected to the first signal line is further configured to automatically exert a specified braking torque on the associated wheel of the vehicle if (a) the second brake control device is first detected to be in the inactive state, and (b) the first brake control device is subsequently detected to be in the inactive state.

5. The brake system as recited in claim 2, wherein each of the wheel actuator devices connected to the first signal line is further configured to automatically exert a specified braking torque on the associated wheel of the vehicle if (a) the wheel actuator devices connected to the second signal line and (b) the first brake control device are in the inactive state.

6. The brake system as recited in claim 2, wherein the first and the second brake control devices are connected to each other by a third signal line.

7. The brake system as recited in claim 6, wherein the first and the second brake control devices are connected by a fourth signal line to: (a) each other; (b) an in-vehicle display device; and (c) at least one external system.

8. The brake system as recited in claim 1, wherein each of the four wheel actuator devices is further configured to: (a) perform an operability check of itself; and (b) further perform at least one of the following when an impairment of operability is detected: (i) switching itself to the inactive state, (ii) outputting a warning signal to at least one of the brake control devices, and (iii) outputting a warning signal to at least one of the other wheel actuator devices.

9. The brake system as recited in claim 8, wherein each of the four wheel actuator devices is further configured to detect, on the basis of the received warning signal, that at least one of the other wheel actuator devices is in the inactive state.

10. A method for operating a brake system, comprising:
    providing a first brake control device and a second brake control device, each of the first and second brake control devices being configured to (a) detect, in the active state, an input of a driver of the vehicle for reducing the current speed of the vehicle and (b) output a corresponding control signal when the input is detected;

providing four wheel actuator devices respectively assigned to four different wheels of the vehicle and configured to exert, in the active state, a braking torque on the associated wheel upon receiving the control signal;

providing a first signal line and a second signal line configured to transmit the control signal, the first signal line connecting the first brake control device to two of the four wheel actuator devices, and the second signal line connecting the second brake control device to the other two wheel actuator devices;

ascertaining a respective state for each of the first brake control device, the second brake control device, and the four wheel actuator devices; and if a specified number of devices among the first brake control device, the second brake control device, and the four wheel actuator devices are detected to be in an inactive state, automatically braking at least one of the wheels of the vehicle by the associated wheel actuator device.

11. The method as recited in claim 10, further comprising:

wherein a message corresponding to at least one of the ascertained respective states is output by at least one of the first and second brake control devices to at least one of an external display device, an external sound output device and an external control device.

* * * * *

UNITED STATES PATENT AND TRADEMARK OFFICE
CERTIFICATE OF CORRECTION

PATENT NO. : 8,548,708 B2  
APPLICATION NO. : 12/452783  
DATED : October 1, 2013  
INVENTOR(S) : Strengert et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 719 days.

Signed and Sealed this
Fifteenth Day of September, 2015

Michelle K. Lee
*Director of the United States Patent and Trademark Office*